Nov. 5, 1968  F. M. ANTHONY  3,409,042
HOT AND COLD WATER MIXER ATTACHMENT
Filed Feb. 9, 1966

INVENTOR.
FELIX M. ANTHONY
BY
Gardner & Zimmerman
ATTORNEYS

United States Patent Office 3,409,042
Patented Nov. 5, 1968

3,409,042
HOT AND COLD WATER MIXER
ATTACHMENT
Felix M. Anthony, Oakland, Calif. (2841 Golden Rain Road No. 7, Walnut Creek, Calif. 94529)
Filed Feb. 9, 1966, Ser. No. 526,307
1 Claim. (Cl. 137—603)

ABSTRACT OF THE DISCLOSURE

A mixing chamber attachment for independent hot and cold water faucets is described which is free of water traps and effective in providing the thorough mixture of the water from the two faucets. The attachment includes a pair of conduits which may be secured to the faucets and direct water therefrom to the chamber of a mixer. The liquid path through the conduits and through the mixture chamber extends downwardly throughout its length so that no water can be trapped within the attachment, and the conduits are so connected to the chamber that water flowing therefrom into the chamber is directed against an opposed wall of the chamber which deflects the water away from the chamber outlet to assure a long resident time of the water within the chamber for thorough mixing.

---

The invention relates to an attachment for use with a pair of independent hot and cold water faucets whereby instead of having separate outlets, the faucets are connected so as to deliver the liquid into a common chamber for mixing therein and discharged therefrom at a selected temperature through a common outlet into a sink or the like positioned thereunder.

Attachments of this general type have been utilized in the past, but in general have not proved satisfactory for a number of reasons. For one thing, many of these prior devices are constructed in a manner such that the liquid remains in the passages in the attachment after the faucets are turned off. This causes deterioration of the attachment and more or less stagnation of the liquid, particularly when water is only infrequently withdrawn. For another thing, since the faucets of different installations are not always the same distance apart, the attachment must be adjustable to permit proper connection to the faucets in the various installations. While adjustable attachments are available, in most instances the connections providing for the adjustment are not efficient in preventing leakage. Also the prior devices do not afford a prompt and thorough mixture of the hot and cold water especially at low rates of flow.

Accordingly, it is an object of the invention to provide an attachment of the character described which will be free of water traps, which is adjustable to permit leak-proof connection to installations where the distance between the faucets are at variance, and which will be effective in providing for the thorough mixture of the water at all normal rates of flow.

Another object of the invention is to provide an attachment of the character described which will have all of the advantages above set forth and can be easily assembled and installed in operative position on the faucets, and will be extremely attractive in appearance.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim.

Referring to said drawings.

Figure 1:
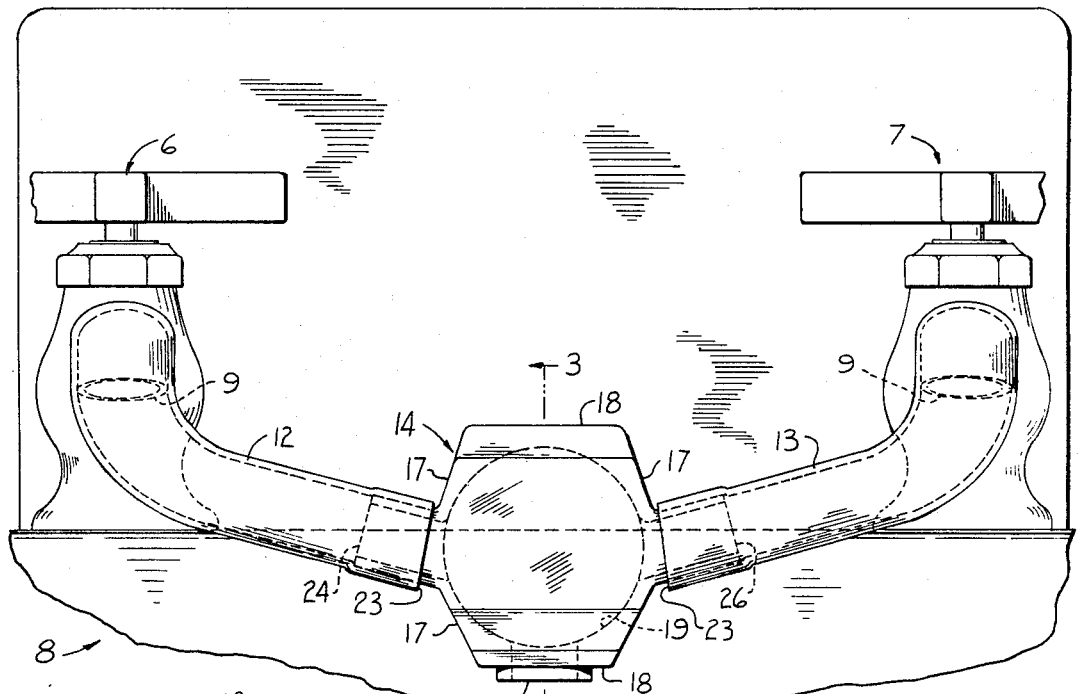
FIGURE 1 is a front elevation of the attachment of my invention as applied to a pair of sink faucets.

As shown in the drawing, the attachment of my invention is designed for assembly on a pair of faucets 6 and 7 mounted on a sink or basin 8. As will be understood, the faucets to which my attachment is designed to be applied are not connected to one another and each faucet has a spout 9 through which water is arranged to be discharged directly into the sink. Conventionally the faucet 6 which is shown at the left in FIGURE 1 will be for delivery of hot water whereas the faucet 7 shown at the right will be for delivery of cold water. Thus, without the use of an attachment of a type such as mine, when the user at the sink desires water at a temperature such as supplied by the individual faucets, it is necessary to mix the water from the two spouts in the necessary proportions directly in the sink or in some other container or vessel held under the faucets.

The attachment of my invention is arranged to be connected to the spouts of both faucets such as by means of tubes or conduits 12 and 13 which form part of the attachment and lead to a mixer 14 supported in a position in the sink or basin above the usual drain at the bottom thereof. The mixer is formed with front and rear walls 16, side walls 17, and top and bottom walls 18. The various walls combine to define therein a chamber 19 in which the water from the different faucets are delivered and intermixed so as to supply water to the sink of the desired temperature. Discharge of the water from the mixing chamber is through an opening 21 in the bottom wall of the mixer.

The conduits are formed of plastic material which will lend flexibility and resilience thereto and have an internal diameter which will permit the conduits to be expanded and fitted tightly at one end 22 over the faucet spouts. The firm and tight fit of the conduits on the spouts provided an adequate water-tight seal thereat. At the same time, the conduits may be removed by admitting air at the opposing surfaces. The other ends 23 of the conduits are tightly fitted on nipples 24 and 26 extending laterally from the side walls 17 of the mixer. The mixer is also formed of plastic material and is form retaining, the conduits being desirably permanently secured to the nipples by a clear cement. Preferably, the plastic material of which the conduits and mixer are made is transparent so that the water passing therethrough is visible from the exterior. Thus, an effective water seal is provided at both ends of the conduits.

As will be clear from FIGURE 1, the conduits extend downwardly from the spouts to the nipples throughout the entire length of the conduits, and the nipples are inclined upwardly from the side walls of the mixer so that the water from the spouts have a continuous and uninterrupted down path to the mixing chamber. Thus, no water traps are created and all water delivered from the faucets may drain from the mixer when the flow is stopped.

Figure 2:
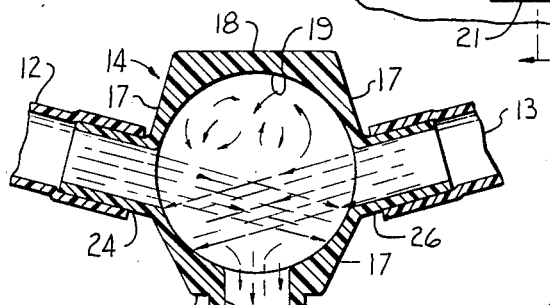
FIGURE 2 is a vertical sectional view through the liquid mixing chamber and adjacent portions of the supply conduits.
Figure 3:
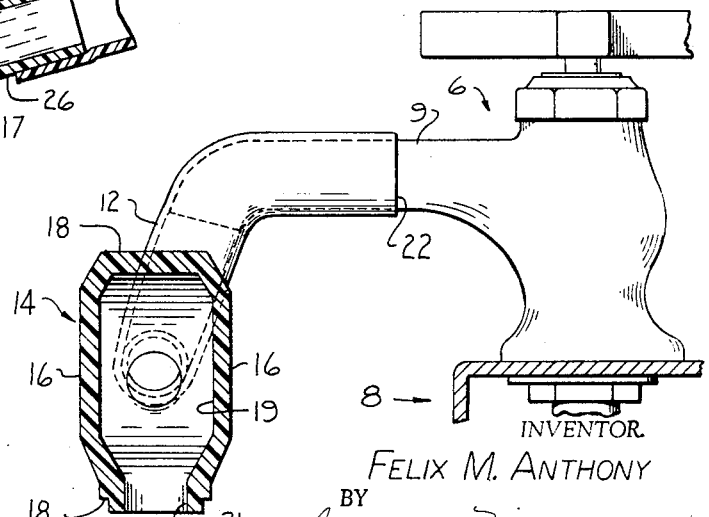
FIGURE 3 is a transverse vertical sectional view taken on the line 3—3 of FIGURE 1.

The mixing chamber is cylindrical in form with the axis perpendicular to the front and rear walls 16. The openings 28 from the nipples to the mixing chamber are disposed in substantially horizontal alignment with the center of the cylinder, however, the axes of the two nipples intersect each other at a point appreciably below such center. In fact, as shown in FIGURE 2, the slope of the nipple passages and their relationship to the cylindrical form of the mixing chamber is such that practically the entire stream of liquid from each nipple will be aimed at the opposing lower inner surface portions of the side walls 17. In this manner much more area of interengagement between the two streams will be had as compared with opposing streams in coaxial alignment. Furthermore, even though the streams from the nipples may not directly strike said opposing wall surface portions, the latter will assure that the major portion of the streams will be quickly moved to the upper portion of the chamber before flowing out of the chamber. Thus a more rapid and thorough intermixing of the hot and cold water streams will be effected even at low pressures.

The volumetric capacity of the mixing chamber with relationship to the minimum cross-sectional area of the discharge outlet 21 is such that a residence time of the two streams in the chamber is of sufficient duration as will assure the necessary heat exchange to provide a uniform temperature for the ordinary household or domestic water pressures and temperatures. It has been found that with the volumetric capacity of the chamber being approximately 2.2 cubic inches and the cross-sectional area of the discharge outlet about .44 square inch, a thorough mixing of the hot and cold water is assured, under most flow rate conditions.

What is claimed is:

1. A liquid mixer attachment for connecting faucets together and providing a common discharge outlet therefor, said mixer comprising a body defining a mixing chamber having a volume sufficient to provide full mixing of the liquids expected to be introduced therein, and a plurality of conduits communicating at one end with said mixing chamber, each of said conduits being flexible and having its free end adapted to receive a downwardly extending end portion of a faucet spout, said body being provided with a discharge outlet communicating with a lowermost chamber of said mixing chamber, said chamber having a liquid path extending downwardly throughout the length thereof from the point of communication of said conduits with the mixing chamber and said lowermost portion thereof, each of said conduits extending downwardly throughout its length from its faucet engaging portion to said mixing chamber whereby said liquid mixer is free of traps for liquid between said faucet engaging portion and said discharge outlet, said body being provided with nipples extending upwardly therefrom and through which said conduits communicate with the mixing chamber, each of said nipples being oriented to direct liquid flowing inwardly therethrough against a wall of said chamber which is oriented to deflect liquid away from said outlet to thereby assure a long residence time of said liquid in said chamber for thorough mixing with other liquid in said chamber, and said mixing chamber being defined by a cylindrical wall with a generally horizontal axis and wherein each of said upwardly extending nipples communicates with the chamber at a point on said wall and is oriented to direct liquid flowing inwardly therethrough against an opposed portion of said wall.

References Cited

UNITED STATES PATENTS 1,385,179    7/1921    Liska _____ 137—603

FOREIGN PATENTS 776,066    10/1934    France.

M. CARY NELSON, *Primary Examiner.*

R. J. MILLER, *Assistant Examiner.*